(12) United States Patent
Nouri et al.

(10) Patent No.: US 12,393,280 B2
(45) Date of Patent: Aug. 19, 2025

(54) ANCHORING TRACKING DEVICE SPACE TO HAND TRACKING SPACE

(71) Applicant: Hewlett-Packard Development Company, L.P., Spring, TX (US)

(72) Inventors: Joseph Nouri, Fort Collins, CO (US); Peter Christian Peterson, Fort Collins, CO (US); Mark Lessman, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/557,376

(22) PCT Filed: Apr. 30, 2021

(86) PCT No.: PCT/US2021/030120
§ 371 (c)(1),
(2) Date: Oct. 26, 2023

(87) PCT Pub. No.: WO2022/231616
PCT Pub. Date: Nov. 3, 2022

(65) Prior Publication Data
US 2024/0220025 A1 Jul. 4, 2024

(51) Int. Cl.
*G06F 3/01* (2006.01)
*G06F 3/03* (2006.01)
*G06F 3/0346* (2013.01)

(52) U.S. Cl.
CPC .............. *G06F 3/017* (2013.01); *G06F 3/011* (2013.01); *G06F 3/0304* (2013.01); *G06F 3/0346* (2013.01)

(58) Field of Classification Search
CPC ........ G06F 3/011; G06F 3/017; G06F 3/0304; G06F 3/0346
See application file for complete search history.

(56) References Cited

U.S. PATENT DOCUMENTS

| | | | |
|---|---|---|---|
| 10,719,953 B1 * | 7/2020 | Ye | G06T 7/246 |
| 11,353,958 B2 * | 6/2022 | Lin | G06V 20/20 |
| 11,506,901 B2 * | 11/2022 | Wang | G06T 7/579 |
| 2009/0257741 A1 | 10/2009 | Greb et al. | |
| 2015/0192241 A1 | 7/2015 | Shannahan et al. | |
| 2016/0348830 A1 | 12/2016 | Zaicevskij | |
| 2017/0274277 A1 * | 9/2017 | Vandonkelaar | G06T 7/246 |
| 2018/0217663 A1 * | 8/2018 | Chandrasekhar | G06F 3/0346 |
| 2018/0285636 A1 * | 10/2018 | Fei | G02B 27/017 |
| 2019/0008971 A1 | 1/2019 | Shea et al. | |
| 2019/0113986 A1 * | 4/2019 | Bikumala | G06F 3/017 |
| 2021/0109590 A1 * | 4/2021 | Gullicksen | G06T 7/73 |

* cited by examiner

*Primary Examiner* — Mihir K Rayan
(74) *Attorney, Agent, or Firm* — Quarles & Brady LLP

(57) ABSTRACT

A computing device receives a notification from a tracking device that the tracking device has entered a gripped state in which a user has securely gripped the tracking device with a hand of the user. The computing device responsively receives orientation data from the tracking device indicative of an orientation of the tracking device in a tracking device space. The computing device determines an orientation of the hand of the user in a hand tracking space from captured image data of the hand of the user and the tracking device. The computing device generates a transformation matrix to anchor the tracking device space to the hand tracking space. The tracking device resultantly enters an anchored state.

20 Claims, 9 Drawing Sheets

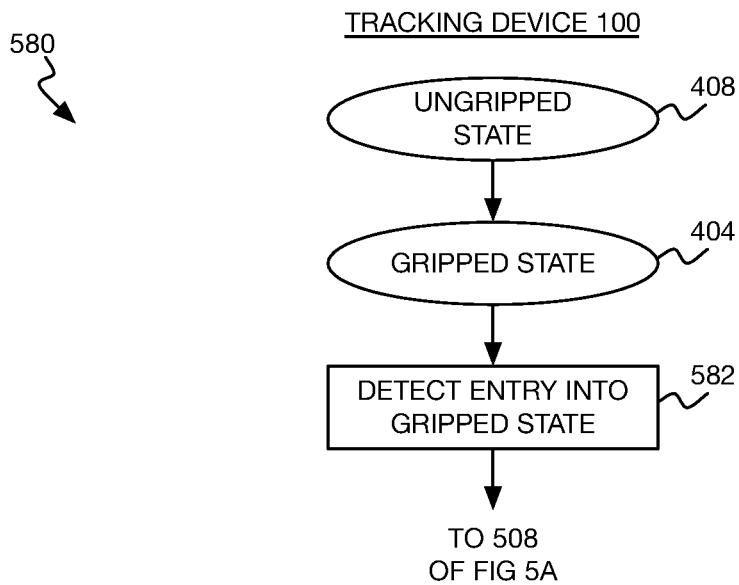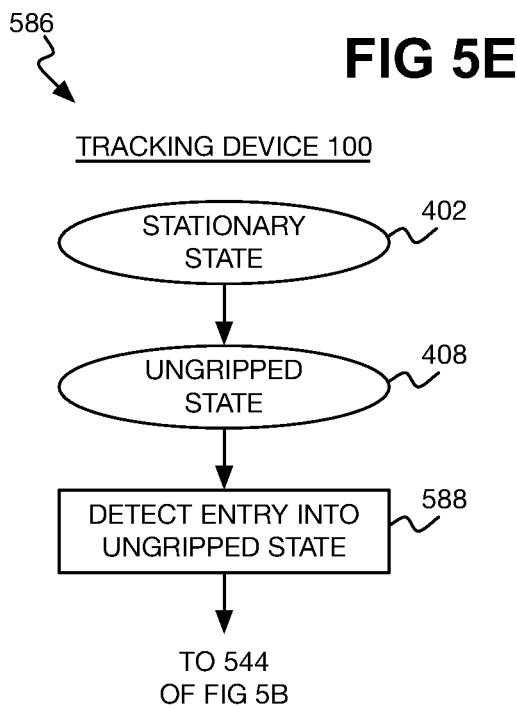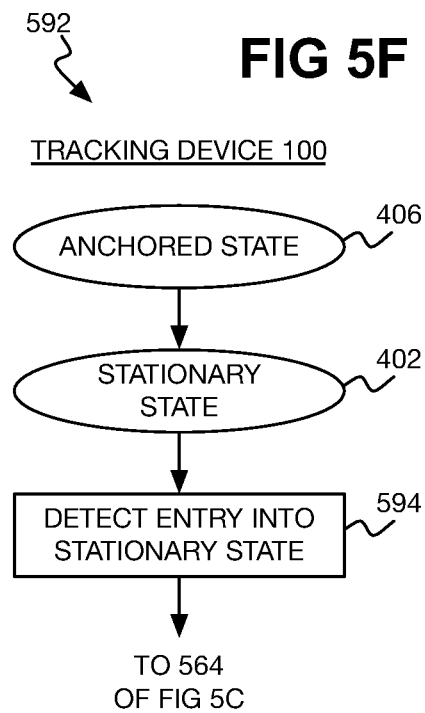

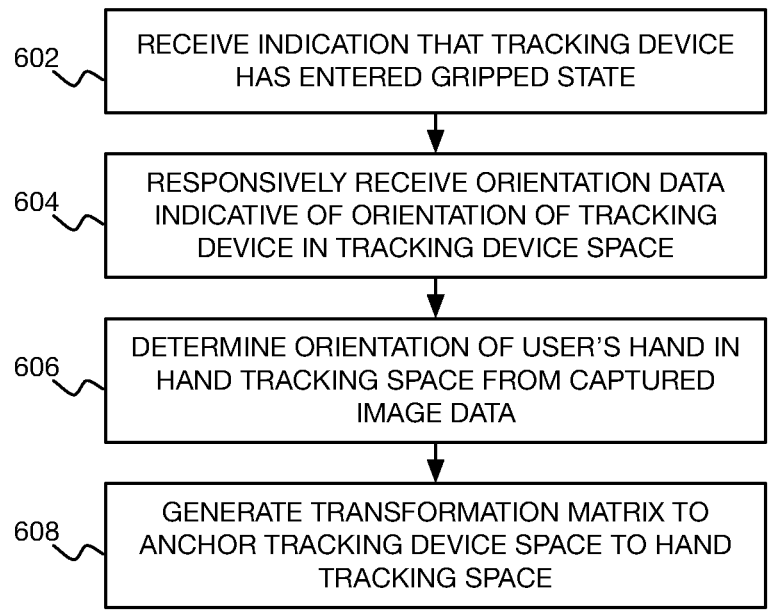
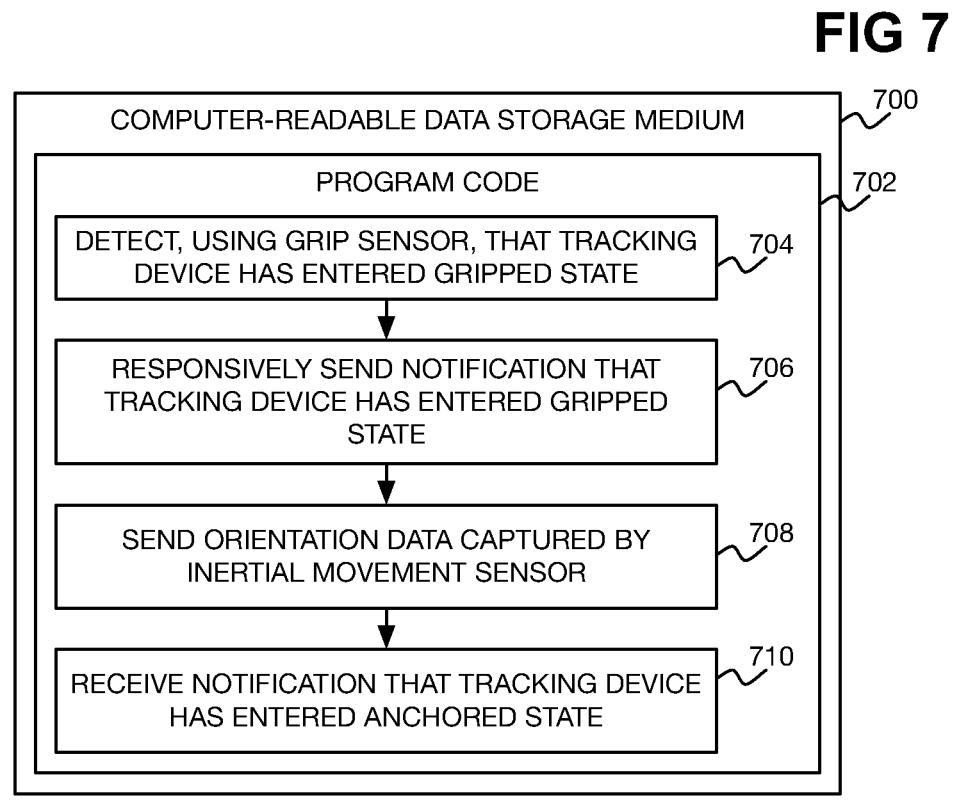

ANCHORING TRACKING DEVICE SPACE TO HAND TRACKING SPACE

BACKGROUND

Extended reality (XR) technologies include virtual reality (VR), augmented reality (AR), and mixed reality (MR) technologies, and quite literally extend the reality that users experience. XR technologies may employ head-mountable displays (HMDs). An HMD is a display device that can be worn on the head. In VR technologies, the HMD wearer is immersed in an entirely virtual world, whereas in AR technologies, the HMD wearer's direct or indirect view of the physical, real-world environment is augmented. In MR, or hybrid reality, technologies, the HMD wearer experiences the merging of real and virtual worlds.

BRIEF DESCRIPTION OF THE DRAWINGS

FIGS. 5A, 5B, 5C, 5D, 5E, and 5F are diagrams of example processes in which the tracking device of FIGS. 1A and 1B transition among the states of FIG. 4.

FIG. 6 is a flowchart of an example method.

FIG. 7 is a diagram of an example non-transitory computer-readable data storage medium.

DETAILED DESCRIPTION

Figure 1A:
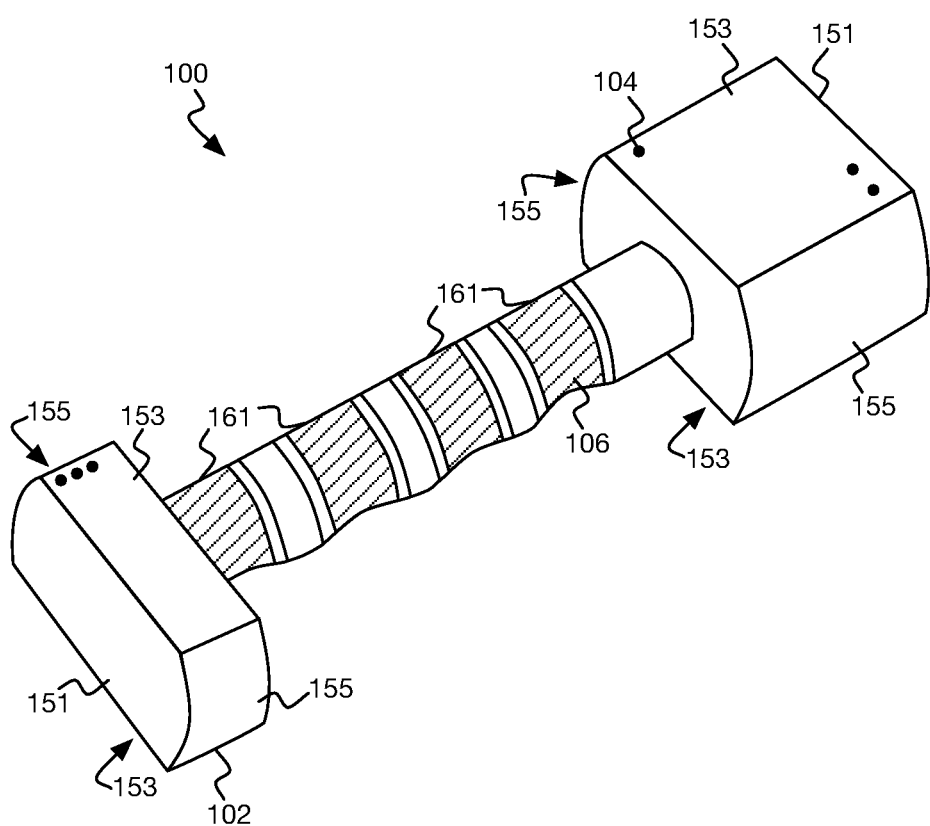
FIGS. 1A and 1B are perspective and block view diagrams, respectively, of an example tracking device that can be used in an extended reality (XR) environment.

As noted in the background, a head-mountable display (HMD) can be employed as an extended reality (XR) technology to extend the reality experienced by the HMD's wearer. An HMD can include a small display panel in front of each eye of the wearer, as well as various sensors to detect or sense the wearer and/or the wearer's environment. Images on the display panels convincingly immerse the wearer within an XR environment, be it a virtual reality (VR), augmented reality (AR), a mixed reality (MR), or another type of XR.

The user wearing an HMD may manipulate virtual objects within an XR environment using his or her hands. To increase the verisimilitude of such virtual object manipulation, the user may manipulate an actual real-world physical object standing in and corresponding to a virtual object. The physical object may be a more general-purpose object that is not actually the virtual object to which it corresponds in the XR environment, and may not have an actual physical appearance corresponding to the appearance of the virtual object. The usage of such a physical object can nevertheless enhance the immersive experience of the user within the XR environment.

Existing such physical objects are often relatively complex and sophisticated handheld controllers with a variety of different sensors and other electronics to permit the controllers to track their manipulation in physical space. Such tracking allows for the corresponding virtual object displayed within the XR environment to appropriately mimic and otherwise mirror the user's actual manipulation of the controller. However, due to their complexity, such handheld controllers are relatively expensive, making them cost prohibitive and limiting their usage in some cases.

Described herein is a tracking device that can be used in an XR environment and which can be manufactured more cost effectively than more complex handheld XR controllers. Specifically, usage of the tracking device leverages camera devices that may already be present to track an XR user's hands in physical space to decrease the number of sensors and other electronics included in the tracking device. Once the user has picked up and securely grasped the tracking device, what is referred to as a tracking device space can be anchored to what is referred to as hand tracking space to interrelate the user's manipulation of the tracking device as detected by the device with the user's hand movements as detected by the camera devices.

The tracking device space is the three-dimensional (3D) coordinate system in relation to which the tracking device monitors orientation of the device as the tracking device is manipulated by the user in physical space. The hand tracking space is the 3D coordinate system in relation to which the camera device tracks movement of the user's hands in physical space. Once the user has securely grasped the tracking device and the tracking device space resultantly anchored to the hand tracking space, subsequent pose changes of the tracking device can be mapped to hand tracking space (and subsequent motion of the user's hand that is holding the device can be mapped to tracking device space).

Figure 1B:
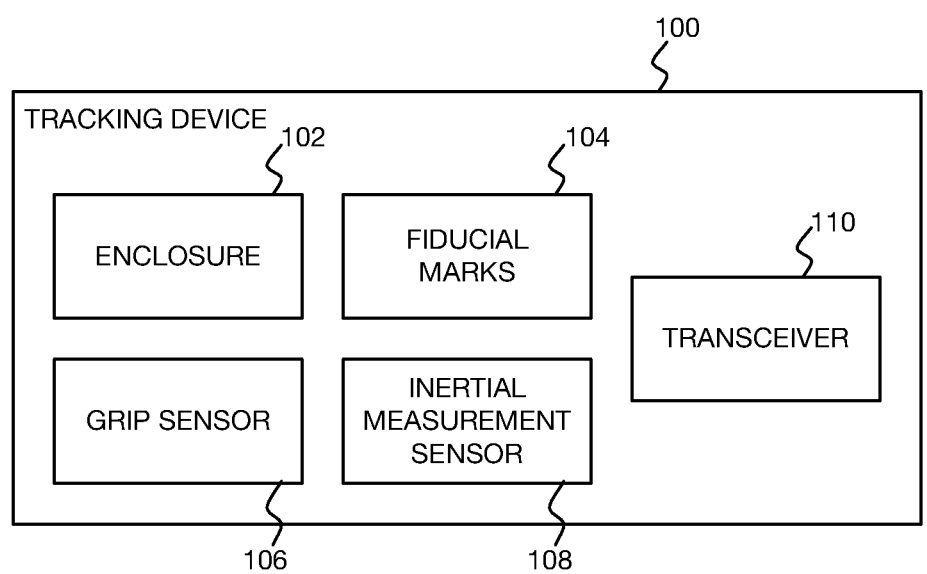

FIGS. 1A and 1B show block and perspective-view diagrams, respectively, of an example tracking device 100. The tracking device 100 includes an enclosure 102 having a geometric shape corresponding to one or multiple poses at which the device 100 is in a stationary state in which a user is not securely gripping the tracking device 100 with his or her hand(s) and the device 100 is at rest. The geometric shape in particular can limit such poses, or positions, in which the device 100 can remain at rest on a horizontal surface such as a table or desktop. In the example, for instance, the geometric shape of the tracking device 100 is such that the device 100 has flat end surfaces 151, flat top and bottom surfaces 153, and round side surfaces 155.

Therefore, when in the stationary state, the tracking device 100 can rest on just one of four surfaces: either end surface 151 or either top or bottom surface 153. If the tracking device 100 were put down on either of its side surfaces 155, the device 100 would topple over and rest on the top or bottom surface 153. In the example, then, the number of poses or positions in which the tracking device 100 can be in the stationary state is governed by the surfaces 151 and 153 being flat and the surfaces 155 being round. To further reduce the poses in which the tracking device 100 can be in the stationary state, the end surfaces 151 can also be round, such that placing the device 100 on either surface 151 also causes the tracking device 100 to topple over and rest on the top or bottom surface 153.

The tracking device 100 has fiducial marks 104 on the enclosure 102. The fiducial marks 104 can be dots or other types of marks that are discernable within captured images of the tracking device 100 relative to the background of the enclosure 102. The number of the fiducial marks 104, and their locations on the enclosure 102, are sufficient to permit calculation of the orientation of the tracking device 100 from such captured images (i.e., captured image data) of the tracking device. The images may be captured by camera devices that are also used to track a user's hands in hand tracking space. Therefore, the fiducial marks 104 within these images can be used to calculate the orientation of the tracking device 100 within hand tracking space as well.

The number and the locations of the fiducial marks 104 on the tracking device 100 are known. Therefore, the orientation of the tracking device 100 in hand tracking space depends on which fiducial marks 104 appear within the captured images, and the pattern and/or positions of the marks 104 relative to one another within the images. Which fiducial marks 104 appear within the images and the pattern and/or positions of the marks 104 relative to one another within the images is itself dependent on the current pose of the tracking device 100 in the stationary state and the position and perspective of the camera device capturing the images. Such known and detected information thus permits calculation of the orientation of the tracking device 100 in hand tracking space.

The number and the locations of the fiducial marks 104 on the tracking device 100 sufficient to permit calculation of the orientation of the device 100 in hand tracking space from captured image data are further dependent on (i.e., take into account) the poses at which the tracking device 100 can be at rest in the stationary state. For instance, the fewer poses or positions at which the tracking device 100 can be in the stationary state, in general the fewer fiducial marks 104 have to be included on the device 100 to permit calculation of the orientation of the tracking device 100 in hand tracking space. This is because the fiducial marks 104 have to account for fewer such at-rest poses of the tracking device 100. Therefore, the geometric shape of the enclosure 102 limiting the poses of the tracking device 100 serves to simplify the number and locations of the fiducial marks 104 as well.

The number and the locations of the fiducial marks 104 on the tracking device 100 sufficient to permit calculation of the orientation of the device 100 in hand tracking space from captured image data are further dependent on (i.e., take into account) on manufacturing tolerances in manufacturing the tracking device 100. That is, how accurately the fiducial marks 104 can be imprinted at specified locations on the tracking device 100 can dictate how close together the marks 104 can be, and thus their locations. Similarly, how many fiducial marks 104 should be included may be dictated by how accurately the marks 104 can be imprinted at specified locations on the tracking device 100.

The tracking device 100 includes a grip sensor 106, which may be a capacitive touch sensor. The grip sensor 106 is exposed at the enclosure 102 of the tracking device 100. In the example, the grip sensor 106 is divided over four portions or rings 161 corresponding to the four fingers (not including the thumb) of a hand of the user. The grip sensor 106 can thus detect when the user has securely gripped the tracking device 100 in a gripped state. That the tracking device 100 is in the gripped state, in other words, corresponds to the user having securely gripped the tracking device 100 with the fingers of his or her hand, as detected by the grip sensor 106.

As one example, the grip sensor 106 may detect a sensor signal at each ring 161 in correspondence with how much of the surface area of the ring 161 is in contact with a corresponding finger of the user's hand. The user may be considered as having securely gripped the tracking device 100 when more than a threshold surface area of each of more than a threshold number of the rings 161 is in contact with a corresponding finger of the user's hand. For example, at least 75% of the surface area of every ring 161 may have to be in contact with a corresponding finger of the user's hand for the user to be considered as securely gripping the tracking device 100 such that the tracking device 100 is in the gripped state.

The tracking device 100 further includes an inertial measurement sensor 108, which may also be referred to as an inertial measurement unit (IMU). The inertial measurement sensor 108 can be situated within the enclosure 102 of the tracking device 100. The inertial measurement sensor 108 detects orientation data indicative of the orientation of the tracking device 100 in tracking device space. For instance, when the user is holding the tracking device 100 and moving, rotating, or otherwise manipulating the device 100 in physical space, the inertial measurement sensor 108 can generate orientation data from which the orientation of the tracking device 100 in tracking device space can be calculated.

The tracking device 100 may be unaware of any camera device tracking the user's hand in a separate hand tracking space, and may otherwise have no knowledge of the hand tracking space. This is why the orientation data captured by the inertial measurement sensor 108 is indicative of the orientation of the tracking device 100 in tracking device space as opposed to hand tracking space. The orientation of the tracking device 100 in tracking device space may be used when the tracking device 100 enters a gripped state in which the user has securely gripped the device 100.

For instance, the orientation of the user's hand grasping the tracking device 100 in hand tracking space may be detected at that time from captured image data, so that a transformation matrix anchoring the tracking device space to the hand tracking space can be resultantly generated. The tracking device 100 is then said to enter an anchored state. Subsequently received orientation data from the tracking device 100 can therefore be transformed from the tracking device to the hand tracking space via application of the transformation matrix.

The orientation of the tracking device 100 in tracking device space may also be used when the device 100 enters an ungripped state, in which the user is no longer securely gripping the tracking device 100 in his or her hand. In this state, the tracking device 100 may be in motion. For instance, the user may have dropped the tracking device 100, or the user may still be holding the device 100 but the tracking device 100 may have slipped in the user's hand or the user may be manipulating the device 100 in such a way that he or she is not firmly gripping the grip sensor 106 of the tracking device 100.

The inertial measurement sensor 108 may be or include magnetometer, compass, accelerometer, and/or gyroscope sensors, among other types of sensors. The inertial measurement sensor 108 may be a six degree-of-freedom ("6DOF") sensor providing measurement signals corresponding to forward/backward (surge), up/down (heave), and left/right (sway) translational motion, as well as pitch, yaw, and roll rotational motion. the inertial measurement sensor 108 may be a nine degree-of-freedom ("9DOF") sensor that also provides measurement signals corresponding to acceleration, magnetic orientation, and angular velocity. In another implementation, the inertial measurement sensor 108 may just be a three degree-of-freedom ("3DOF") sensor providing measurement signals corresponding to pitch, yaw, and roll rotational measurement.

The tracking device 100 includes a transceiver 110 by which the device 100 can send and receive information. For example, when the grip sensor 106 has detected that the tracking device 100 has entered a gripped state or an ungripped (and in motion) state, the transceiver 110 may transmit a corresponding notification to a computing device to which the tracking device 100 is communicatively connected. The transceiver 110 may also transmit a notification when the inertial measurement sensor 108 has detected that the tracking device 100 has entered a stationary (and ungripped) state, and can transmit orientation data captured by the sensor 108 responsive to entry of the device 100 in various states. The transceiver 110 may further receive a notification from a computing device that the tracking device 100 has entered an anchored state in which the tracking device space has been anchored to the hand tracking space as a result of the computing device generating a transformation matrix.

Figure 2A:
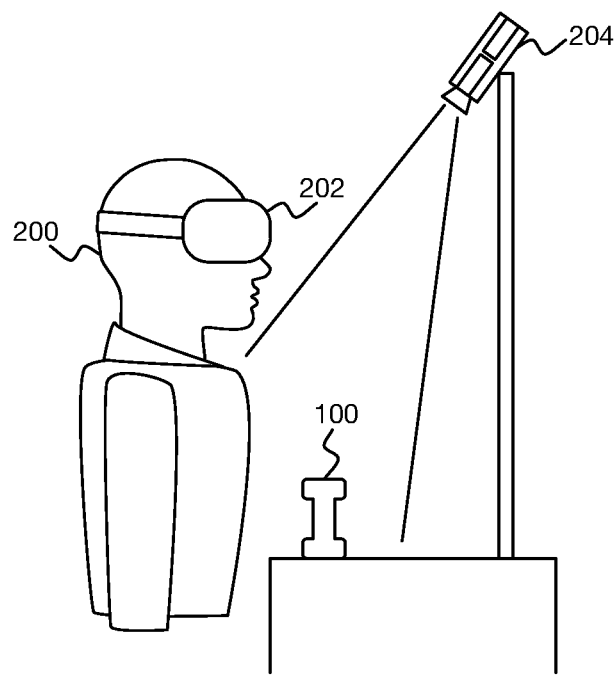
FIGS. 2A and 2B are diagrams depicting example usage of the tracking device of FIGS. 1A and 1B in an XR environment.
Figure 2B:
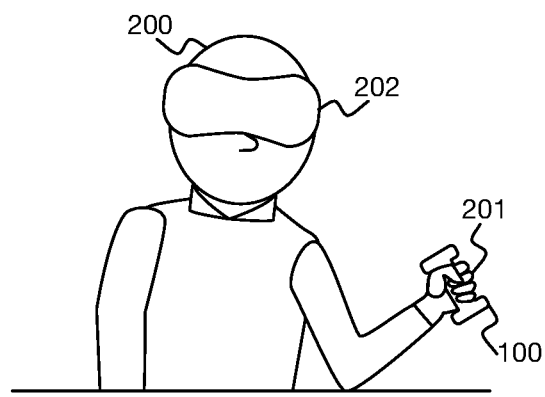

FIGS. 2A and 2B show example usage of the tracking device 100 in an XR environment. A user 200 is wearing an HMD 202. For example, the HMD 202 may include a display device to project images viewable by the user to immerse the user 200 in the XR environment. The HMD 202 may also include sensors, such as eye-tracking sensors to track the focus of the user 200's gaze, sensors to track rotation and movement of the user 200's head, and so on. Per the side view of FIG. 2A, the XR environment can include a camera device 204. The camera device 204 captures images of the space in front of the user, including the tracking device 100 and, per FIG. 2B, the user's hand 201. The camera device 204 may be part of the HMD 202 instead of separate from the HMD 202 as depicted.

In FIG. 2A, the user 200 is not holding the tracking device 100, and instead the device 100 is at rest on a horizontal surface in front of the user 200. From images captured by the camera device 204, the orientation of the tracking device 100 in hand tracking space can be determined, based on the number and positions of the fiducial marks 104 within the captured images as has been described. This 3D coordinate system is the coordinate system in which orientations of objects appearing in images captured by the camera device 204 can be detected. This space is referred to as hand tracking space, however, in that it was originally intended to track the hands of the user 200 (such as the hand 201 in FIG. 2B), but is leveraged herein to also determine the orientation of the tracking device 100 when in the stationary state.

In FIG. 2B, the user 200 has picked up and is securely grasping the tracking device 100 in the gripped state. The orientation of the hand 201 in which the user 200 is holding the tracking device 100 can be determined in hand tracking space from images captured by the camera device 204. Furthermore, the orientation of the tracking device 100 can be determined in tracking device space from orientation data captured by the inertial measurement sensor 108 of the device 100. The tracking device space is the 3D coordinate system of the inertial measurement sensor 108.

Because the user 200 is securely gripping the tracking device 100 in FIG. 2B, as the user 200 rotates or moves his or her hand 201, the tracking device 100 correspondingly rotates or moves. That is, the tracking device 100 cannot rotate or move without a corresponding rotation or movement of the user's hand 201. For example, if the user 200 rotates his or her hand 201 twenty degrees clockwise, the tracking device 100 also rotates twenty degrees clockwise, and does not differently rotate, because the tracking device 100 is being securely grasped by the user 200. Similarly, if the user 200's hand 201 moves four inches to the left, the tracking device 100 also moves four inches to the left, and so on.

Therefore, when the tracking device 100 is in the gripped state in which the user 200 is securely gripping the device 100, as detected by the grip sensor 106 of the tracking device 100, tracking device space can be anchored to hand tracking space, with the device 100 resultantly entering an anchored state. That is, at the time when the tracking device 100 enters the gripped state, the device 100 has an orientation in tracking device space as indicated by the orientation data that the inertial measurement sensor 108 captures. At this same time, the user 200's hand 201 has a corresponding orientation in hand tracking space as can be determined from the images that the camera device 204 captures.

A transformation matrix can thus be calculated that transforms tracking device space to hand tracking space, from the corresponding orientations of the tracking device 100 and the hand 201 of the user 200. Any subsequent change in orientation of the tracking device 100 (as indicated by the orientation data captured by the inertial measurement sensor 108) can be transformed from the tracking device space to the hand tracking space by applying (e.g., multiplying) the transformation matrix. Similarly, any subsequent change in orientation of the user 200's hand 201 (as determined from images captured by the camera device 204) can be transformed from the hand tracking space to the tracking device space by applying (e.g., multiplying) an inverse of the transformation matrix.

The transformation matrix, in other words, links or anchors tracking device space to hand tracking space (and vice-versa). The transformation matrix therefore permits changes in orientation of the tracking device 100 as detected by the device 100 itself to be mapped to hand tracking space, and likewise permits changes in orientation of the hand 201 of the user 200 as detected from images captured by the camera device 204 to be mapped to tracking device space. The linking or anchoring of the two spaces by the transformation matrix remains in effect so long as the tracking device 100 remains in its (currently) anchored state. Once the user 200 lets go of or is no longer securely gripping the tracking device 100, tracking device space becomes unanchored and unlinked from hand tracking space, with the device 100 resultantly exiting the anchored state.

Figure 3:
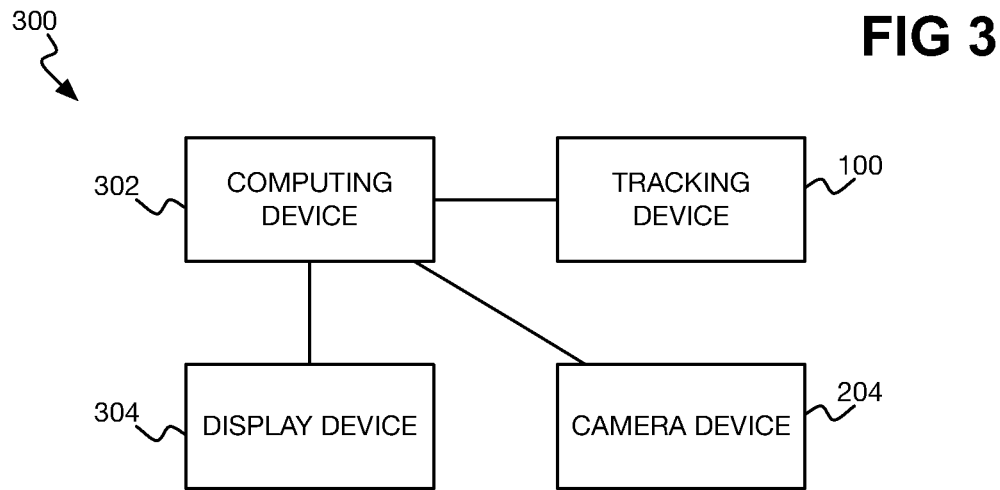
FIG. 3 is a block diagram of an example XR system including the tracking device of FIGS. 1A and 1B.

FIG. 3 shows an example XR system 300 including the tracking device 100. The XR system 300 also includes the camera device 204 that has been described, as well a computing device 302 and a display device 304. The computing device 302 may be a desktop, laptop, or notebook computer, or another type of computing device, such as a smartphone, tablet computing device, and so on. The display device 304 displays images to immerse the user 200 in an XR environment, and may be part of the HMD 202 worn by the user 200.

In the system 300, the computing device 302 is communicatively connected to the tracking device 100, the camera device 204, and the display device 304. The computing device 302 can thus receive orientation data from the tracking device 100 that is indicative of the orientation of the device 100 in tracking device space, and from which the computing device 302 can calculate the orientation of the tracking device 100 in tracking device space. The computing device 302 can further receive images captured by the camera device 204 from which the device 302 can calculate the orientation of the hand 201 of the user 200 in hand tracking space. Therefore, when the tracking device 100 has entered the gripped state, the computing device 302 can anchor the tracking device space to the hand tracking space via generation of a transformation matrix to cause the tracking device 100 to enter the anchored state.

The computing device 302 can then correspondingly adjust or modify the XR environment in which the user 200 is participating. Specifically, the computing device 302 can cause the display device 304 to display images based on the orientations of the user 200's hand 201 and the tracking device 100 as transformed into a common 3D coordinate system (i.e., either the hand tracking space or the tracking device space). As one example, in a VR or AR environment, the virtual object to which the tracking device 100 corresponds can be correctly displayed in orientation relative to the user 200's hand 201 because the tracking device space has been anchored to the hand tracking space.

Figure 4:
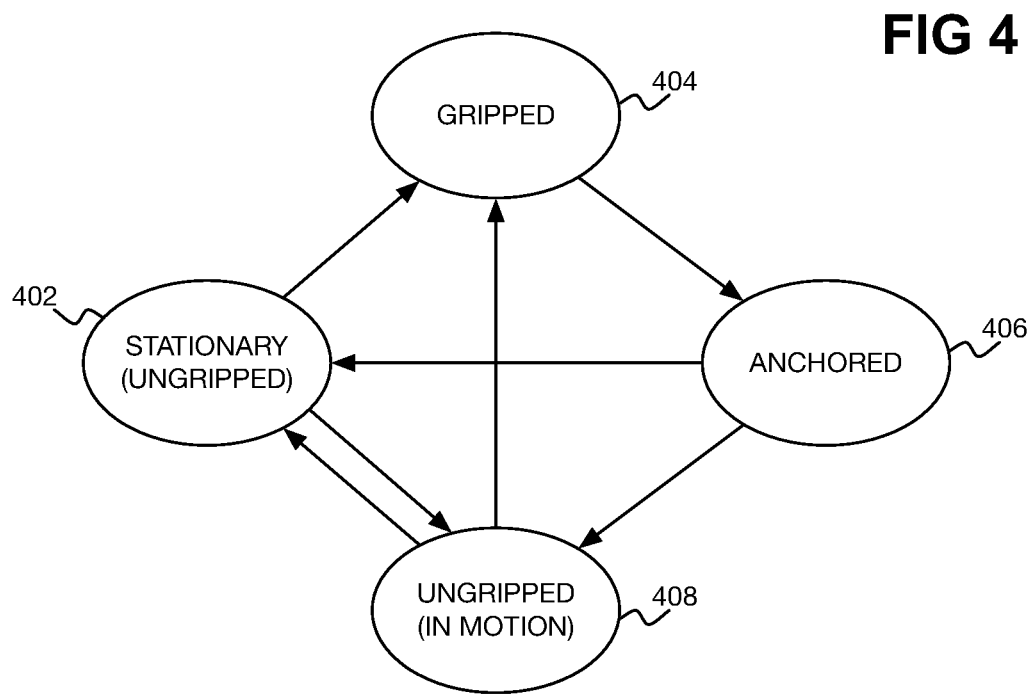
FIG. 4 is a state diagram of example states of the tracking device of FIGS. 1A and 1B.

FIG. 4 shows a state diagram of the example states of the tracking device 100. The tracking device 100 may specifically have four states: a stationary state 402, a gripped state 404, an anchored state 406, and an ungripped state 408. In the stationary state 402, the tracking device 100 is at rest in a given pose or position in which the device 100 is lying on a surface such as a table or desktop. In the stationary state 402, the tracking device 100 is not being securely gripped by the user 200, and indeed the user 200 may not be in contact with the device 100 at all. The stationary state 402 is a non-transitory state, in that the tracking device 100 can remain indefinitely in the stationary state 402 and not immediately transition to another state.

From the stationary state 402, the tracking device 100 may transition to the gripped state 404 or to the ungripped state 408. In the gripped state 404, the user has securely grasped or gripped the tracking device 100, as detected by the inertial measurement sensor 108 of the device 100. The tracking device 100 may or may not be in motion. For example, the user 200 may securely pick up the tracking device 100, or may securely grip the device 100 while it remains stationary. The gripped state 404 is a transitory state, however, in that the tracking device 100 does not remain in the gripped state 404 indefinitely but rather transitions to the anchored state 406 once the tracking device space has been anchored to the hand tracking space.

From the gripped state 404, the tracking device 100 therefore transitions to the anchored state 406 in which tracking device space is anchored to hand tracking space. From a physical perspective, there may be no difference between the gripped state 404 and the anchored state 406: in each, the tracking device 100 is securely gripped by the user 200. The tracking device 100 transitions from the gripped state 404 to the anchored state 406 once the tracking device space has been anchored to the hand tracking space—i.e., once the transformation matrix has been generated. The anchored state 406 is a non-transitory state, and the tracking device 100 can remain in the anchored state 406 so long as the user 200 continues to securely grip the device 100 with his or her hand 201 without slippage.

From the anchored state 406, the tracking device 100 can transition back to the stationary state 402, or to the ungripped state 408. If the user 200 puts the tracking device 100 down in a pose in which the device 100 can remain stationary and at rest when the user 200 lets go of the tracking device 100 with his or her hand 201, the device 100 transitions to the stationary state 402. However, if the user 200 instead puts the tracking device 100 down in an unstable position in which the device 100 then topples over to a stable position when the user 200 lets go of the tracking device 100, the device 100 transitions to the ungripped state 408.

The tracking device 100 also transitions from the anchored state 406 to the ungripped state 408 if the device 100 slips in the user 200's hand 201, or is otherwise manipulated by the user 200 such that it is no longer being securely gripped as detected by the grip sensor 106 of the tracking device 100. The tracking device 100 further transitions from the anchored state 406 to the ungripped state 408 if the user 200 simply lets go of or throws the device 100 in space, allowing the tracking device 100 to freefall or otherwise move. Similarly, the tracking device 100 transitions from the stationary state 402 to the ungripped state 408 if the user 200 knocks over the device 100 while it is at rest, without first securely gripping the tracking device 100.

In the ungripped state 408, therefore, the tracking device 100 is in motion. The ungripped state 408 is a transitory state, in that the tracking device 100 cannot remain in the ungripped state 408 indefinitely. Rather, from the ungripped state 408 the tracking device 100 will soon (or at least eventually) transition to the gripped state 404 or the stationary state 402. The tracking device 100 transitions from the ungripped state 408 to the gripped state 404 if the user 200 securely grips the device 100, and transitions to the stationary state 402 if the tracking device 100 instead stops moving and is not securely grasped by the user 200.

Figure 5A:
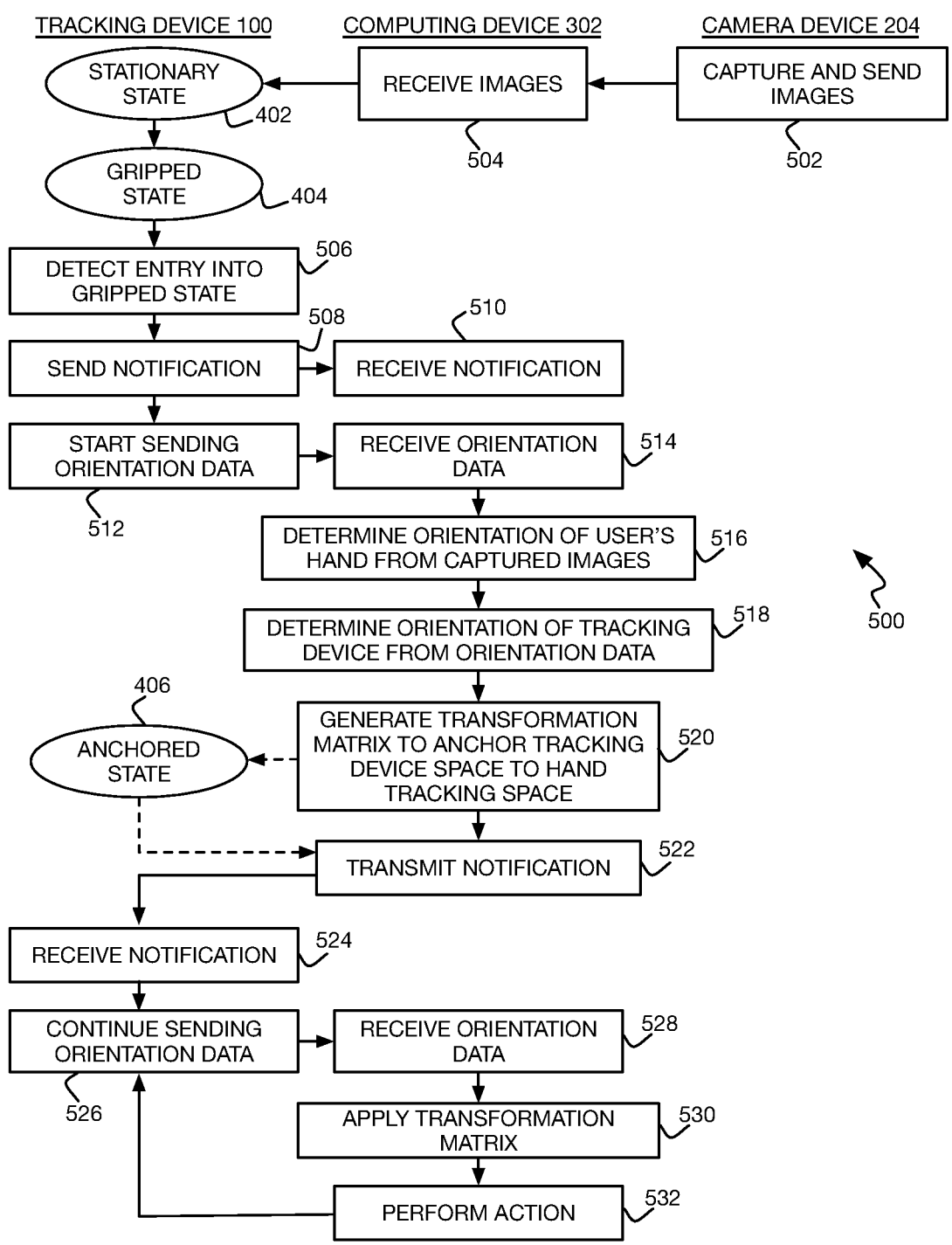

FIG. 5A shows an example process 500 by which the tracking device 100 transitions from the stationary state 402 through the gripped state 404 to the anchored state 406. The parts of the process 500 in the left column are performed by the tracking device 100, the parts in the middle column are performed by the computing device 302, and the parts in the right column are performed by the camera device 204. The camera device 204 continually captures and sends images to the computing device (502), which receives the captured images (504). The images are of the area in front of the user 200, and may include either hand 201 of the user 200, and/or the tracking device 100.

From the stationary state 402, the tracking device 100 transitions to the gripped state 404 in which the user 200 has securely gripped the device 100 with his or her hand 201. The grip sensor 106 of the tracking device 100 detects entry of the device 100 into the gripped state 404 (506), and the transceiver 110 of the tracking device 100 responsively sends a notification to the computing device 302 that the device 100 has entered the gripped state 404 (508). The computing device 302 receives this notification (510), and therefore the devices 100 and 302 are in sync as to the current state of the device 100.

Responsive to entry of the tracking device 100 entering the gripped state 404, the transceiver 110 also starts sending to the computing device 302 orientation data that is indicative of the orientation of the device 100 in the tracking device space as captured by the inertial movement sensor 108 (512). The computing device 302 thus receives the orientation data (514). The computing device 302 then determines, or calculates, the orientation of the hand 201 of the user 200 in which the tracking device 100 is securely gripped, in hand tracking space, from the images captured by the camera device 204 (516). The computing device 302 also determines, or calculates, the orientation of the tracking device 100 in tracking device space from the orientation data received from the device 100 (518).

The calculated orientation of the user 200's hand 201 in hand tracking space corresponds to the calculated orientation of the tracking device 100 in tracking device space, since the user 200 is securely gripping the device 100 in his or her hand 201. Therefore, the computing device 302 generates a transformation matrix that anchors the tracking device space to the hand tracking space based on these orientations (520). The transformation matrix specifically maps the orientation of the tracking device 100 in tracking device space to the orientation of the user 200's hand 201 in hand tracking space to map the tracking device space to the hand tracking space. For example, singular value decomposition (SVD) can be used to map the orientation of the tracking device 100 to the orientation of the user 200's hand 201 to anchor the tracking device space to the hand tracking space.

As a result of generation of the transformation matrix, the tracking device 100 is considered to have entered the anchored state 406. That is, in the anchored state the tracking device space is anchored to the hand tracking space. Therefore, since generation of the transformation matrix anchors the tracking device space to the hand tracking space, such generation causes the tracking device 100 to enter the anchored state 406. Unlike entry of the tracking device 100 into the gripped state 404, the ungripped state 408, and the stationary state 402, which the device 100 may itself detect, the computing device 302 causes (and thus in effect detects) entry of the tracking device 100 into the anchored state 406.

The computing device 302 sends a notification to the tracking device 100 that the device 100 has entered the anchored state 406 (522). The transceiver 110 of the tracking device 100 receives this notification (524), so that both the device 100 and the computing device 302 are in sync with respect to the current state of the tracking device 100. While in the anchored state 406, the transceiver 110 continues to send orientation data indicative of the orientation of the tracking device 100 in tracking device space, as captured by the inertial measurement sensor 108 (526), which the computing device 302 receives (528).

As the computing device 302 receives orientation data from the tracking device 100 that is indicative of the device 100's orientation in tracking device space, the device 302 can apply (e.g., multiply) the previously generated transformation matrix to the orientation data to transform the tracking device 100's orientation from the tracking device space to the hand tracking space (530). The computing device 302 may then perform an action based on the orientation of the tracking device 100 as has been transformed into hand tracking space (532). As has been noted, for instance, the images displayed by the display device 304 may be adjusted or modified in correspondence with the transformed orientation of the tracking device 100. For example, a virtual object corresponding to the tracking device 100 may have its orientation modified in the displayed images in correspondence with the transformed orientation of the device 100.

The transformation matrix that is generated in part 520 and is applied to orientation data indicative of the orientation of the tracking device 100 in tracking device space is specific to the current entry of the device 100 into the anchored state 406. That is, when the tracking device 100 transitions from the anchored state 406 to a different state (e.g., the stationary state 402 or the ungripped state 408), the generated transformation matrix is not valid if the device 100 subsequently reenters the anchored state 406. Rather, each time the tracking device 100 enters the anchored state 406, the transformation matrix has to be recalculated. This is because the orientation of the tracking device 100 vis-à-vis the orientation of the user 200's hand 201 can differ each time the user 200 securely grips the device 100 and causes the tracking device 100 to enter the gripped state 404.

Figure 5B:
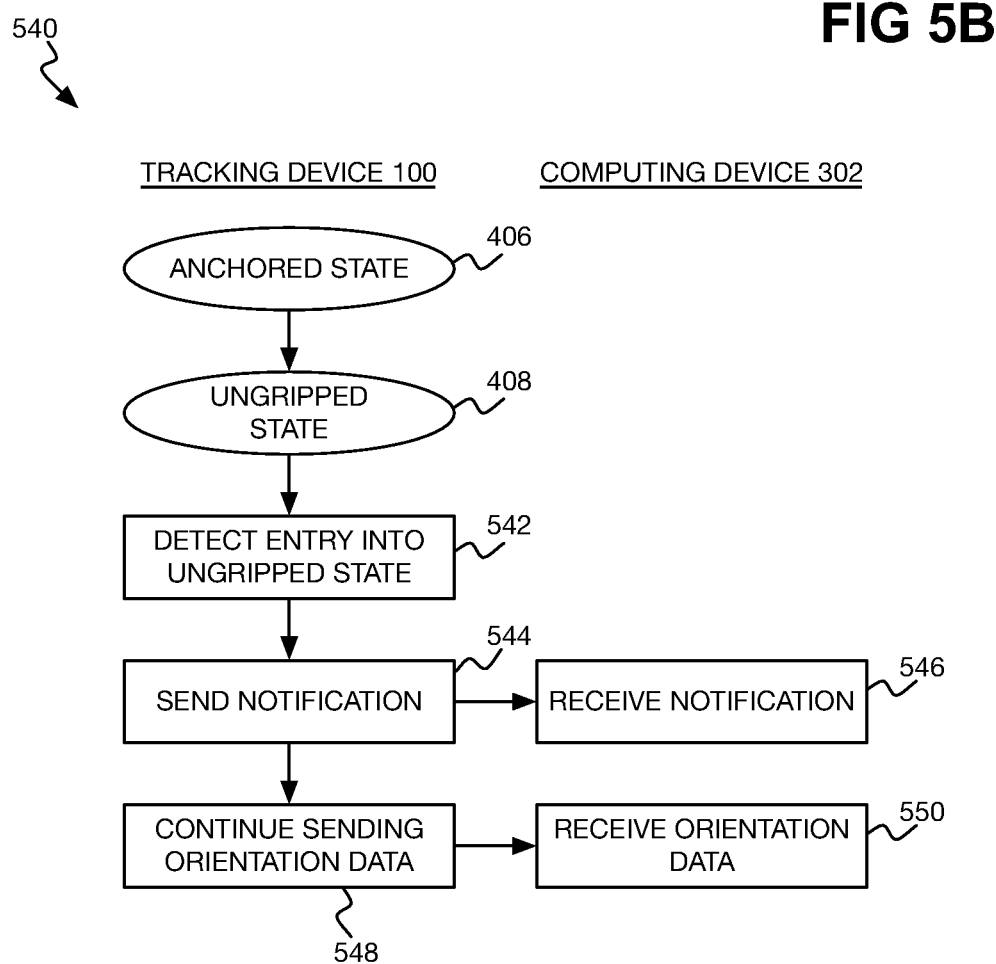

FIG. 5B shows an example process 540 by which the tracking device 100 transitions from the anchored state 406 to the ungripped state 408. The parts of the process 540 in the left column are performed by the tracking device 100, and the parts in the right column are performed by the computing device 302. From the anchored state 406, the tracking device 100 transitions to the ungripped state 408 in which the user 200 is no longer securely gripping the device 100 and the tracking device 100 is in motion. For example, the user may no longer be holding the tracking device 100 at all, or may still be holding the device 100 but not be securely gripping the tracking device 100.

The grip sensor 106 of the tracking device 100 detects entry of the device 100 into the ungripped state 408 (542), and the transceiver 110 of the tracking device 100 responsively sends a notification to the computing device 302 that the device 100 has entered the ungripped state 408 (542), which the computing device 302 correspondingly receives (546). The devices 100 and 302 are therefore in sync as to the current state of the tracking device 100. The transceiver 110 may continue sending to the computing device 302 orientation data indicative of the tracking device's 100 orientation in tracking device space as captured by the inertial measurement sensor 108 (548). The computing device 302 thus may continue receiving this orientation data (550).

Because the tracking device 100 is no longer in the anchored state 406, the tracking device space is no longer anchored to the hand tracking space. Therefore, the previously generated transformation matrix can no longer be applied to the orientation data to transform the orientation of the tracking device 100 from tracking device space to hand tracking space. As noted, though, the tracking device 100 may still continue sending this orientation data to the computing device 302, such as in an implementation in which the computing device 302 (as opposed to the tracking device 100) detects transition of the device 100 from the ungripped state 408 to the stationary state 402. For example, when the orientation data received from the tracking device 100 indicates that the orientation of the device 100 has stabilized, the computing device 302 can conclude and thus detect that the tracking device 100 is at rest and therefore has entered the stationary state 402.

Figure 5C:
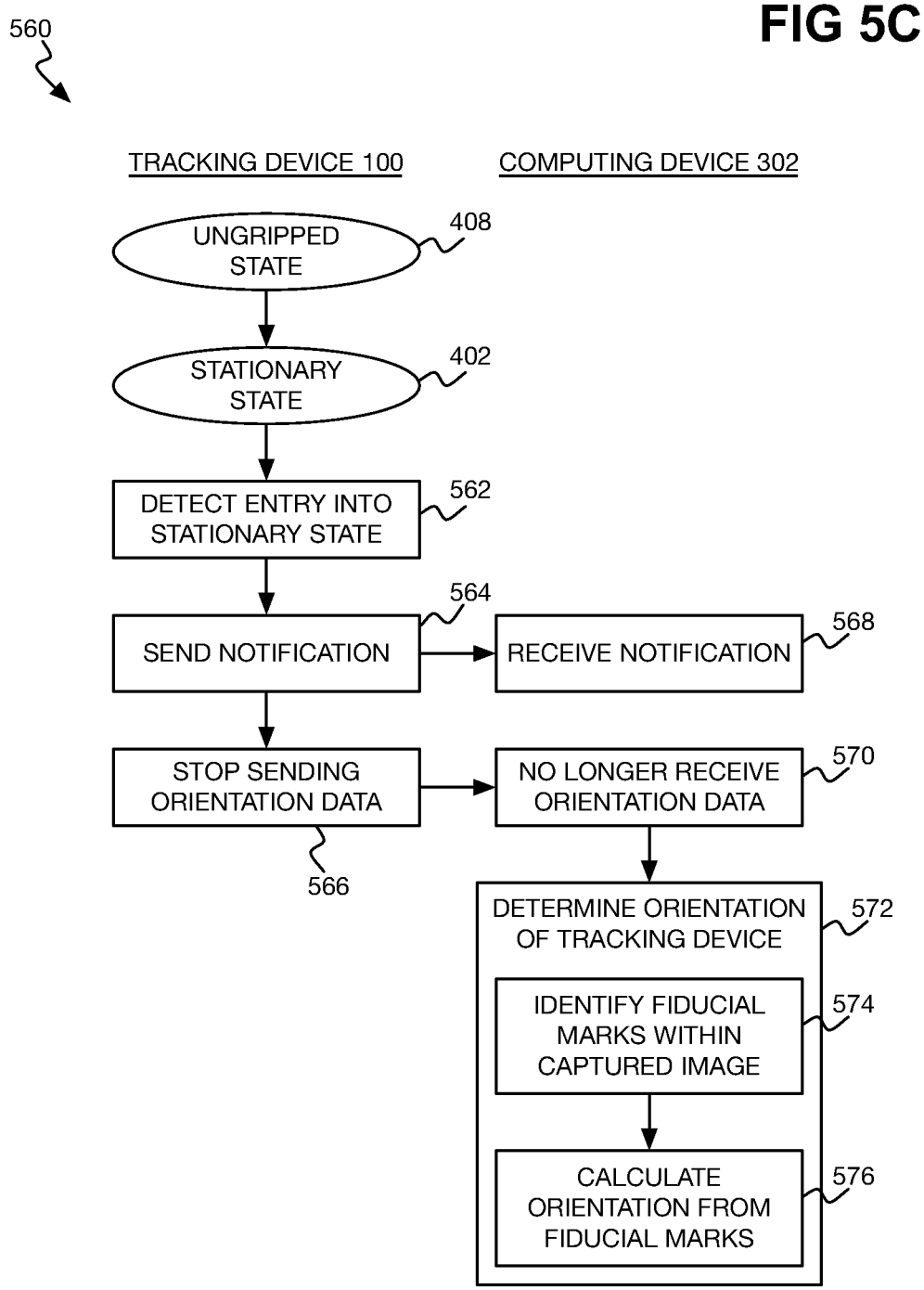

FIG. 5C shows an example process 560 by which the tracking device 100 transitions from the ungripped state 408 back to the stationary state 402. The parts of the process 560 in the left column are performed by the tracking device 100, and the parts in the right column are performed by the computing device 302. From the ungripped state 408 in which the user 200 is not securely gripping the tracking device 100 and the device 100 is in motion, the tracking device 100 transitions to the stationary state 402 at which the device 100 is no longer in motion and thus at rest.

In the example, the inertial measurement sensor 108 of the tracking device 100 detects entry of the device 100 into the stationary state 402 (562), such as by the sensor 108 determining that the orientation data indicative of the orientation of the tracking device 100 in tracking device space has stabilized. The transceiver 110 of the tracking device 100 correspondingly sends a notification to the computing device 302 that the device 100 has entered the stationary state 402 (564), which the device 302 receives (568). However, in another implementation, the computing device 302 may instead detect entry of the tracking device 100 into the stationary state 402, as has been described, in which case the computing device 302 sends a notification to the tracking device 100, which the transceiver 110 receives. In either case, the devices 100 and 302 are in sync as to the current state of the tracking device 100.

Upon detection of entry of the tracking device 100 in the stationary state 402, the transceiver 110 stops sending orientation data indicative of the orientation of the device 100 in tracking device space to the computing device 302 (566). The inertial measurement sensor 108 may similarly stop capturing the orientation data, or it may continue capturing the data with the transceiver 110 just not sending the captured data. In either case, the computing device 302 no longer receives orientation data from the tracking device 100 indicative of the device 100's orientation in tracking device space (570).

Upon detection of entry of the tracking device 100 in the stationary state 402, the computing device 302 also determines the orientation of the tracking device 100 in hand tracking space from the images captured by the camera device 204 (572). Specifically, the computing device 302 can identify which fiducial marks 104 of the tracking device 100 appear in the captured images (574), and calculate the orientation of the tracking device 100 based on which of the fiducial marks 104 have been identified and based on known information regarding the locations of these marks 104 on the device 100 (576). For example, the positions of the identified fiducial marks 104 relative to one another, the pattern of these marks 104, and so on, within the captured images can be compared to their known positions relative to one another on the tracking device 100 and/or to their known pattern on the device 100 to calculate the orientation of the tracking device 100 in hand tracking space.

The orientation of the tracking device 100 is calculated in hand tracking space, as opposed to tracking device space, because the orientation is calculated from images captured by the camera device 204 and not from orientation data captured by the inertial measurement sensor 108 of the device 100. That is, whereas the orientation data captured by the tracking device 100 is indicative of the orientation of the device 100 in tracking device space, the images captured by the camera device 204 are indicative of orientation in hand tracking space. The same camera device 204 used to track and thus determine the orientation of the user 200's hand 201 in hand tracking space is therefore leveraged to track and determine the orientation of the tracking device 100 when the device 100 has entered the stationary state 402.

FIG. 5D shows an example process 580 by which the tracking device 100 transitions from the ungripped state 408 to the gripped state 404. The process 580 is performed by the tracking device 100. From the ungripped state 408 in which the user 200 is not securely gripping the tracking device 100 but the device 100 is in motion, the tracking device 100 transitions to the gripped state 404 in which the user 200 is securely gripping the device 100 in his or her hand 201. The grip sensor 106 of the tracking device 100 detects entry of the device 100 into the gripped state 404 (582). The process 580 then continues at part 508 of FIG. 5A, such that the tracking device 100 ultimately reenters the anchored state 406 (i.e., with the computing device 302 redetermining both the orientation of the user 200's hand 201 and the orientation of the tracking device 100, and reanchoring tracking device space to hand tracking space by regenerating the transformation matrix).

FIG. 5E shows an example process 586 by which the tracking device 100 transitions from the stationary state 402 to the ungripped state 408. The process 586 is performed by the tracking device 100. From the stationary state 402 in which the tracking device 100 is at rest, the device 100 transitions to the ungripped state 408 in which the tracking device 100 is in motion but is either not gripped by the user 200 or if gripped is insecurely gripped by the user 200.

In the example, the inertial measurement sensor 108 of the tracking device 100 may detect entry into the ungripped state 408 from the stationary state 402 (588). For example, the inertial measurement sensor 108 may detect that the tracking device 100 is no longer stationary, with the grip sensor 106 detecting that the device 100 is not securely gripped by the user 200. The process 586 then continues at part 544 of FIG. 5B, with transmission of a corresponding notification to the computing device 302.

In another implementation, however, the computing device 302 may detect transition of the tracking device 100 from the stationary state 402 to the ungripped state 408 if the device 302 is still receiving orientation data from the device 100 indicative of the tracking device 100's orientation. That is, the computing device 302, instead of the tracking device 100, may detect that the captured orientation data indicates that the device 100's orientation is no longer stable and is changing over time. In this case, the computing device 302 may send a corresponding notification to the tracking device 100.

FIG. 5F shows an example process 592 by which the tracking device 100 transitions from the anchored state 406 to the stationary state 402. The process 592 is performed by the tracking device 100. From the anchored state 406 in which the user 200 is securely gripping the tracking device 100 and in which the tracking device space has been anchored to the hand tracking space, the device 100 transitions to the stationary state 402 in which the user 200 is either not gripping the tracking device 100 or is not securely gripping the device 100, and the tracking device 100 is at rest.

In the example, the tracking device 100 detects entry of the tracking device 100 into the stationary state 402 from the anchored state 406 (594). For instance, the inertial measurement sensor 108 of the tracking device 100 can detect that the device 100 is not in motion and the grip sensor 106 of the tracking device 100 can detect that the user 200 is either not gripping the device 100 at all or is not securely gripping the device 100. The process 592 then continues at part 564 of FIG. 5C, with transmission of a corresponding notification to the computing device 302.

In another implementation, however, the computing device 302 may detect transition of the tracking device 100 from the anchored state 406 to the stationary state 402. While the tracking device 100 is in the anchored state 406, the computing device 302 receives orientation data captured by the inertial measurement sensor 108 of the device 100. The computing device 302 can therefore detect from this captured orientation data that the tracking device 100 is at rest. If the computing device 302 also receives a notification that the user 200 is no longer securely gripping the tracking device 100, as detected by the grip sensor 106 of the device 100, the computing device 302 can conclude that the tracking device 100 has entered the anchored state. In this case, the computing device 302 may send a corresponding notification to the tracking device 100.

FIG. 6 shows an example method 600. The method 600 includes receiving, by a computing device 302 from a tracking device 100, a notification that the tracking device has entered a gripped state 404 in which a user has securely gripped the tracking device with a hand 201 of the user 200 (602). The method 600 includes responsively receiving, by the computing device 302 from the tracking device 100, orientation data indicative of an orientation of the tracking device 100 in a tracking device space (604).

The method 600 includes determining, by the computing device 302, an orientation of the hand 201 of the user 200 in a hand tracking space from captured image data of the hand of the user and the tracking device 100 (606). The method 600 includes generating, by the computing device 302, a transformation matrix to anchor the tracking device space to the hand tracking space (608). The tracking device therefore resultantly enters an anchored state 406.

FIG. 7 shows an example non-transitory computer-readable data storage medium 700 storing program code 702 executable by a tracking device 100 to perform processing. The processing includes detecting, using a grip sensor 106 of the tracking device 100, that the tracking device 100 has entered a gripped state 404 in which a user 200 has securely gripped the tracking device 100 with a hand 201 of the user 200 (704). The processing includes responsively sending to a computing device 302 a notification that the tracking device 100 has entered the gripped state 404 (706), and orientation data captured by an inertial measurement sensor 108 of the tracking device 100 and indicative of an orientation of the tracking device 100 in a tracking device space (708). The processing includes receiving from the computing device 302 a notification that the tracking device 100 has entered an anchored state 406 in which the tracking device space has been anchored to a hand tracking space of the hand 201 of the user 200 (710).

Techniques have been described for anchoring tracking device space to hand tracking space. A tracking device is employed that can detect when a user has securely gripped the device and that can capture orientation data indicative of the device's orientation in tracking device space. Upon the tracking device detecting that it has entered a gripped state, a computing device determines the orientation of the user's hand in which the tracking device has been securely gripped, in hand tracking space, from captured images. The computing device determines the orientation of the tracking device in tracking device space from the captured orientation data, and generates a transformation matrix mapping the determined orientation of the tracking device to the determined orientation of the user's hand to anchor tracking device space to hand tracking space. The techniques thus leverage the images already being captured by a camera device for hand tracking, and as a result the tracking device can be more cost effectively produced since it may include just a grip sensor, an inertial measurement sensor, and a transceiver in terms of the tracking device's primary if not only electronics.

We claim:

1. A method comprising:
   receiving, by a computing device from a tracking device, a notification that the tracking device has entered a gripped state in which a user has securely gripped the tracking device with a hand of the user;
   responsive to receiving the notification that the tracking device has entered the gripped state: receiving, by the computing device from the tracking device, orientation data indicative of an orientation of the tracking device in a tracking device space;
   determining, by the computing device, an orientation of the hand of the user in a hand tracking space from captured image data of the hand of the user and the tracking device;
   generating, by the computing device, a transformation matrix to anchor the tracking device space to the hand tracking space, the tracking device resultantly entering an anchored state;
   receiving, by the computing device from the tracking device, a notification that the tracking device has entered, from the anchored state, a stationary state in which the user is not securely gripping the tracking device with the hand of the user and the tracking device is at rest, the computing device no longer receiving from the tracking device the orientation data indicative of the orientation of the tracking device in the tracking device space; and
   determining, by the computing device, the orientation of the tracking device in the hand tracking space from the captured image data without using the transformation matrix.

2. The method of claim 1, further comprising, while the tracking device remains in the anchored state:
   continuing to receive, by the computing device from the tracking device, the orientation data indicative of the orientation of the tracking device in the tracking device space;
   applying, by the computing device, the transformation matrix to the orientation data to transform the orientation of the tracking device into the hand tracking space; and
   performing, by the computing device, an action based on the orientation of the tracking device as transformed into the hand tracking space.

3. The method of claim 1, further comprising:
   receiving, by the computing device from the tracking device, a notification that the tracking device has entered, from the anchored state, an ungripped state in which the user is not securely gripping the tracking device with the hand of the user and the tracking device is in motion; and
   responsive to receiving the notification that the tracking device has entered, from the anchored state, the ungripped state: continuing to receive, by the computing device from the tracking device, the orientation data indicative of the orientation of the tracking device in the tracking device space.

4. The method of claim 3, wherein determining the orientation of the tracking device in the hand tracking space from the captured image data comprises:
   identifying fiducial marks on the tracking device within the captured image data; and
   calculating the orientation of the tracking device in the hand tracking space based on the identified fiducial marks and known information regarding locations of the fiducial marks on the tracking device.

5. The method of claim 3, further comprising:
   receiving, by the computing device from the tracking device, a notification that the tracking device has entered, from the ungripped state, the gripped state;
   responsive to receiving the notification that the tracking device has entered, from the ungripped state, the gripped state: continuing to receive, by the computing device from the tracking device, the orientation data indicative of the orientation of the tracking device in the tracking device space;
   redetermining, by the computing device, the orientation of the hand of the user in the hand tracking space from the captured image data; and
   regenerating, by the computing device, the transformation matrix to reanchor the tracking device space to the hand tracking space, the tracking device resultantly reentering the anchored state.

6. The method of claim 1, further comprising:
   sending, by the computing device to the hand tracking device, a notification that the tracking device has entered the anchored state; and
   continuously receiving, by the computing device from a camera device, the captured image data of the hand of the user and the tracking device.

7. The method of claim 1, further comprising, by the computing device, modifying an extended reality (XR) environment in which the user is participating based on the orientation of the hand of the user and the orientation of the tracking device in either the hand tracking space or the tracking device space.

8. A non-transitory computer-readable data storage medium storing program code executable by a tracking device to perform processing comprising:
   detecting, using a grip sensor of the tracking device, that the tracking device has entered a gripped state in which a user has securely gripped the tracking device with a hand of the user;
   responsive to detecting that the tracking device has entered the gripped state: sending to a computing device a notification that the tracking device has entered the gripped state;
   responsive to sending to the computing device the notification: starting to send to the computing device orientation data captured by an inertial measurement sensor of the tracking device and indicative of an orientation of the tracking device in a tracking device space; and
   receiving from the computing device a notification that the tracking device has entered an anchored state in which the tracking device space has been anchored to a hand tracking space of the hand of the user.

9. The non-transitory computer-readable data storage medium of claim 8, wherein the processing further comprises:
   detecting, using the grip sensor, that the tracking device has entered, from the anchored state, an ungripped state in which the user is not securely gripping the tracking device with the hand of the user and the tracking device is in motion;
   responsive to detecting that the tracking device has entered, from the anchored state, the ungripped state: sending to the computing device a notification that the tracking device has entered, from the anchored state, the ungripped state;
   continuing to send to the computing device the orientation data captured by the inertial measurement sensor of the tracking device and indicative of the orientation of the tracking device in the tracking device space;
   detecting, using the inertial measurement sensor, that the tracking device has entered, from the ungripped state, a stationary state in which the user is not securely gripping the tracking device with the hand of the user and the tracking device is at rest;
   responsive to detecting that the tracking device has entered, from the ungripped state, the stationary state: sending to the computing device a notification that the tracking device has entered the stationary state; and
   no longer sending to the computing device any orientation data captured by the inertial measurement sensor and indicative of the orientation of the tracking device in the tracking device space.

10. The non-transitory computer-readable data storage medium of claim 8, wherein the processing further comprises:
    detecting, using the grip sensor, that the tracking device has entered, from the anchored state, an ungripped state in which the user is not securely gripping the tracking device with the hand of the user and the tracking device is in motion;
    responsive to detecting that the tracking device has entered, from the anchored state, the ungripped state: sending to the computing device a notification that the tracking device has entered, from the anchored state, the ungripped state;
    continuing to send to the computing device the orientation data captured by the inertial measurement sensor of the tracking device and indicative of the orientation of the tracking device in the tracking device space;
    detecting, using the grip sensor, that the tracking device has entered, from the ungripped state, the gripped state;
    responsive to detecting that the tracking device has entered, from the ungripped state, the gripped state: sending to the computing device a notification that the tracking device has entered, from the ungripped state, the gripped state;
    continuing to send to the computing device the orientation data captured by the inertial measurement sensor of the tracking device and indicative of the orientation of the tracking device in the tracking device space; and
    receiving from the computing device a notification that the tracking device has reentered the anchored state.

11. The non-transitory computer-readable data storage medium of claim 8, wherein the processing further comprises:
    detecting, using the grip sensor and the inertial measurement sensor, that the tracking device has entered, from the anchored state, a stationary state in which the user is not securely gripping the tracking device with the hand of the user and the tracking device is at rest;
    responsive to detecting that the tracking device has entered, from the anchored state, the stationary state: sending to the computing device a notification that the tracking device has entered, from the anchored state, the stationary state; and
    no longer sending to the computing device any orientation data captured by the inertial measurement sensor and indicative of the orientation of the tracking device in the tracking device space.

12. A tracking device comprising:
    an enclosure having a geometric shape corresponding to one or multiple poses at which the tracking device is in a stationary state in which a user is not securely gripping the tracking device with a hand of the user and the tracking device is at rest;
    a plurality of fiducial marks on the enclosure, a number of the fiducial marks and locations of the fiducial marks on the enclosure sufficient to permit calculation of an orientation of the tracking device in a hand tracking space from captured image data of the tracking device, taking into account the poses to which the geometric shape of the enclosure corresponds at which the tracking device is in the stationary state;
    a grip sensor exposed at the enclosure to detect secure gripping of the tracking device such that the tracking device is in a gripped state; and
    a transceiver to, responsive to the grip sensor detecting that the tracking device is in the gripped state:
      send a notification that the tracking device has entered the gripped state, and
      start sending orientation data indicative of an orientation of the tracking device in a tracking device space.

13. The tracking device of claim 12, further comprising:
    an inertial measurement sensor within the enclosure to detect the orientation data indicative of the orientation of the tracking device in the tracking device space while the tracking device is in the gripped state or is in an ungripped state in which the user is not securely gripping the tracking device with the hand of the user and the tracking device is in motion.

14. The tracking device of claim 12, wherein the transceiver is to send a notification that the tracking device is in the stationary state, the gripped state, or the ungripped state, to send the orientation data, and to receive a notification that the tracking device is in an anchored state in which the tracking device space has been anchored to a hand tracking space of the hand of the user.

15. The tracking device of claim 12, wherein the transceiver is to:
- send a notification that the tracking device has entered, from an anchored state in which the tracking device space has been anchored to a hand tracking space of the hand of the user, an ungripped state in which the user is not securely gripping the tracking device with the hand of the user and the tracking device is in motion; and
- responsive to sending the notification that the tracking device has entered, from the anchored state, the ungripped state: continue to send the orientation data indicative of the orientation of the tracking device in the tracking device space.

16. The tracking device of claim 15, wherein:
- the grip sensor is to detect that the tracking device has entered, from the ungripped state, a stationary state in which the user is not securely gripping the tracking device with the hand of the user and the tracking device is at rest, and
- the transceiver is to, in response to the grip sensor detecting that the tracking device has entered, from the ungripped state, the stationary state: stop sending the orientation data indicative of the orientation of the tracking device in the tracking device space.

17. The tracking device of claim 15, wherein:
- the grip sensor is to detect that the tracking device has entered, from the ungripped state, the gripped state, and
- the transceiver is to, in response to the grip sensor detecting that the tracking device has entered, from the ungripped state, the gripped state: continue to send the orientation data indicative of the orientation of the tracking device in the tracking device space.

18. The tracking device of claim 17, wherein the transceiver is to, in response to continuing to send the orientation data indicative of the orientation data of the tracking device in the tracking space: receive a notification that the tracking device has reentered the anchored state.

19. The tracking device of claim 12, wherein the transceiver is to:
- send a notification that the tracking device has entered, from an anchored state in which the tracking device space has been anchored to a hand tracking space of the hand of the user, a stationary state in which the user is not securely gripping the tracking device with the hand of the user and the tracking device is at rest; and
- responsive to sending the notification that the tracking device has entered, from the anchored state, the stationary state: no longer transmit the orientation data indicative of the orientation of the tracking device in the tracking device space.

20. The tracking device of claim 12, wherein the tracking device is a handheld controller of an extended reality (XR) environment.

* * * * *